United States Patent [19]
Mulkey

[11] Patent Number: 4,955,456
[45] Date of Patent: Sep. 11, 1990

[54] HUNTING VEST WITH ATTACHED ROPE

[76] Inventor: Dennis Mulkey, 272 S. Road Number 3 SW., Cartersville, Ga. 30120

[21] Appl. No.: 382,083

[22] Filed: Jul. 18, 1989

[51] Int. Cl.[5] .......................... A62B 35/00; A41D 1/04
[52] U.S. Cl. ................................................ 182/3; 2/94
[58] Field of Search ............................. 2/94; 182/3-9

[56] References Cited

U.S. PATENT DOCUMENTS

| | | | |
|---|---|---|---|
| 3,498,408 | 3/1970 | Foote | 182/6 |
| 4,177,877 | 12/1979 | Gallinati | 182/3 |
| 4,273,216 | 6/1981 | Weissmann | 182/3 |
| 4,308,629 | 1/1982 | Freemon | 182/3 |
| 4,687,074 | 8/1987 | Green | 182/3 |
| 4,854,418 | 8/1989 | Hengstenberger | 192/3 |

Primary Examiner—Reinaldo P. Machado
Attorney, Agent, or Firm—John L. James

[57] ABSTRACT

A hunting vest is provided for the upper torso of a human body. The vest has a back panel, a left front panel and a right front panel. A reinforced waistband has left and right end portions connected to one another and to the panels of the vest. The end portions of the reinforced waistband can be securely fastened to one another. A left panel reinforcing band is attached to the left front panel, the back panel and the reinforced waistband. A right panel reinforcing band is attached to the right front panel, the back panel and the reinforced waistband. The rope is connected to the waistband adjacent the back panel. An expandable pouch is provided for storing a rope.

3 Claims, 1 Drawing Sheet

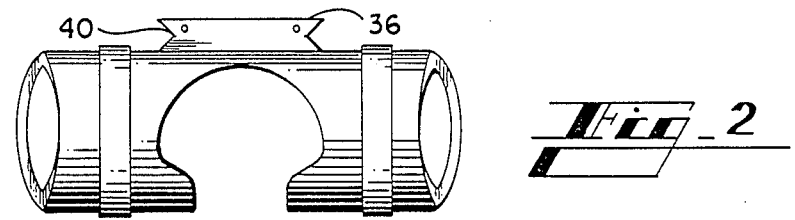
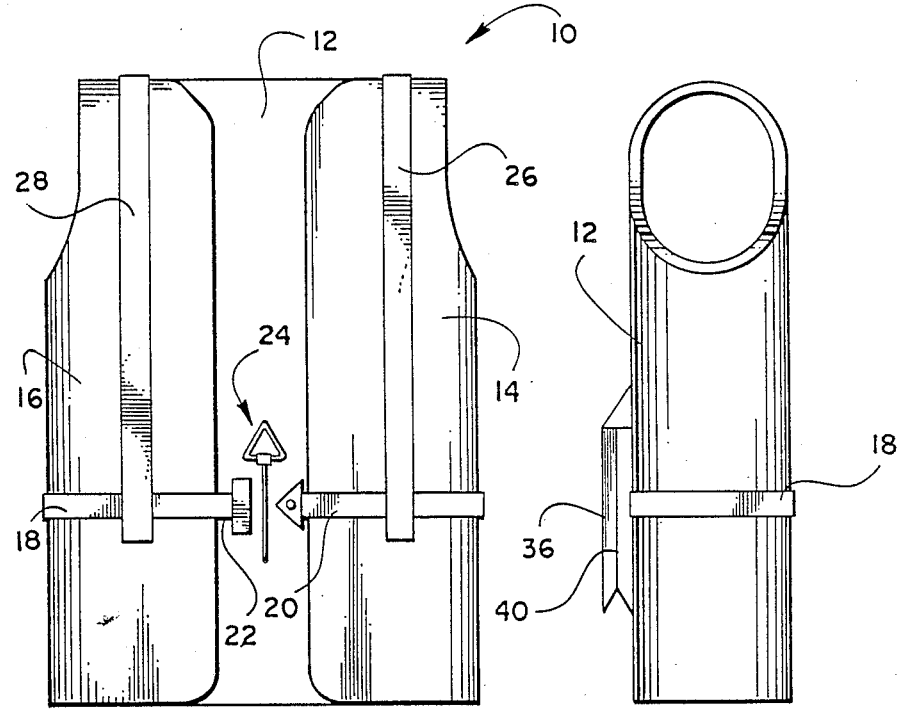
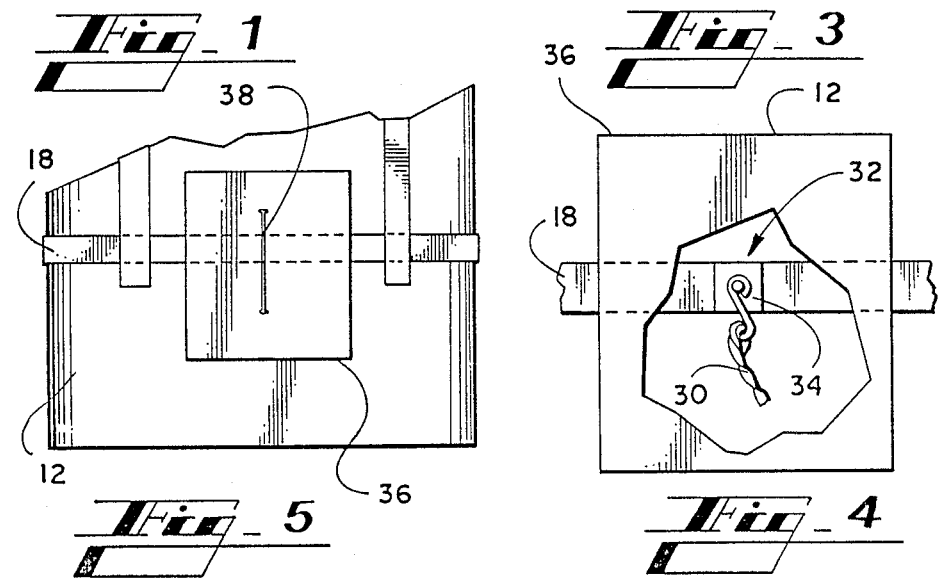

HUNTING VEST WITH ATTACHED ROPE

TECHNICAL FIELD

This invention relates generally to articles of clothing, and more particularly, to a protective vest of the type worn by hunters.

BACKGROUND OF THE INVENTION

A hunter, particularly a deer hunter, wears protective clothing. The protective clothing may be boots, for example, to protect the feet from hazards, or the clothing may be a vest. A vest may be of the camouflage variety or of the familiar fluorescent orange that is highly visible to help prevent hunting accidents.

A deer hunter may perch himself in a tree along a deer trail or near a deer feeding or watering area to await deer. Many hunters perch themselves of tree limbs; some hunters build perches or platforms in the trees. One problem with limbs and perches is that their area is limited. It is not uncommon for a hunter to fall from a tree or slip from the perch injuring himself. It will be appreciated that it would be highly desirable to have a perch from which the danger of falling is eliminated.

To reduce the risk of injury due to falling from the tree, some hunters tie one end of a rope around their waist and tie the other end to the tree. The rope will help prevent a hunter from falling out of the tree, but having a rope around the waist is cumbersome, restricts the movement of the hunter, and can itself cause injury to the ribs or abdomen in case of a fall. A rope is bulky and awkward to handle when climbing the tree. Also, the rope is only as good as the knots used to tie its ends, with at least two knots being required in the field. Accordingly, it will be appreciated that it would be highly desirable to have a rope that is not bulky, requires only one knot to be tied in the field during use, and is not tied around the waist of the hunter.

SUMMARY OF THE INVENTION

The present invention is directed to overcoming one or more of the problems set forth above. Briefly summarized, according to the present invention, a hunting garment for the upper torso of a human body comprises a vest having a back panel, a left front panel and a right front panel. A reinforced waistband has left and right end portions and is attached to the left, right and back panels of the vest. Apparatus is provided for securely fastening the end portions of the reinforced waistband to one another. A left panel reinforcing band is attached to the left front panel, the back panel and the reinforced waistband. A right panel reinforcing band is attached to the right front panel, the back panel and the reinforced waistband. Apparatus, connected to the waistband, is provided for attaching a rope to the waistband adjacent the back panel.

It is an object of the present invention to provide a hunting garment that can be worn by a hunter when hunting and while perched in a tree awaiting game. A hunting vest provides the bright fluorescent orange required to protect a hunter from other hunters, and provides an attachment for the rope to protect the hunter from a fall.

Another object of the invention is to provide a hunting garment with a rope that is not bulky and requires few knots. One end of the rope is attached to the vest, thus requiring only the end of the rope that is connected to the tree to be tied in the field. The rope is not tied about the waist of the hunter and will not injure the hunter if the hunter should fall.

Another object of the invention is to provide a hunting vest with a rope attached to prevent the hunter from falling from a perch or tree. The length of the rope is sufficient for attaching to both the hunter and the tree, but the length is minimal because there is only one knot to be tied in the field. Less rope is required for the hunter to tie one knot in the rope than is required to tie two knots.

Another object of the invention is to provide a hunting vest with a pouch attached for storing a rope that is attached to secure the hunter. The pouch is a convenient receptacle for storing the rope until needed and frees the hands for other activities.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a simplified front view of a preferred embodiment of a hunting vest according to the present invention.

FIG. 2 is a simplified top view of the hunting vest illustrated in FIG. 1 showing a pouch for storing rope.

FIG. 3 is a simplified left side view of the hunting vest illustrated in FIG. 1 showing a pouch for storing rope.

FIG. 4 is a rear view of the pouch of FIGS. 2 and 3 with sections cut away revealing the rope connected to the reinforced waistband.

FIG. 5 is a diagrammatic rear view of the hunting vest of FIG. 1 illustrating an opening in the pouch for accessing the rope.

DETAILED DESCRIPTION OF THE PREFERRED EMBODIMENTS

Referring now to the drawings, in which like numerals indicate like elements throughout the several figures, FIGS. 1–3 illustrate a protective hunting garment 10 for the upper torso of a human body. The hunting vest 10 has a back panel 12, a left front panel 14 and a right front panel 16 sewn together to form the vest as is well known in the art. A hunting vest of this type may consist of a single layer of fabric, or multiple layers if the vest is to also keep the torso warm. A protective hunting vest functions, via its fluorescent orange coloration, to make the hunter highly visible to other hunters. Some hunting vests, and fishing vests, are brown, green or have a camouflage pattern to make the hunter less visible to the prey. The present invention works equally well with either type of hunting vest because its construction.

The vest 10 has a reinforced waistband 18 that has a left end portion 20 and a right end portion 22. The left end portion 20 is attached, preferably by sewing, to the back panel 12 and left front panel 14. Similarly, the right end portion 22 is attached to the back panel 12 and right front panel 16. Means, such as a buckle or clasp assembly 24, are provided for securely fastening the end portions 20, 22 of the reinforced waistband 18 one to the other.

A left panel reinforcing band 26 is attached, preferably by sewing, to the left front panel 14, back panel 12 and waistband 18. Similarly, a right panel reinforcing band 28 is attached to the right front panel 16, back panel 12 and waistband 18. Although rope can be used, the reinforcing bands 26, 28 are preferably flat strips of strong, flexible durable material.

Referring to FIG. 4, the rope 30 is connected to the waistband 18 adjacent the back panel 12 by an attaching means 32, such as a turnbuckle or an S-hook, for example. The attaching means preferably includes a loop 34 formed by a portion of the reinforced waistband 18 adjacent the back panel 12 that is free of attachment to the back panel 12. The rope 30 can be attached directly to the loop 34, but it is preferred that a turnbuckle or an S-hook be used to minimize twisting or tangling of the rope.

Referring to FIGS. 2–5, the hunting vest 10 includes means, such as a pouch 36, for storing the rope 30. The pouch 36 is attached to the back panel 12 of the vest 10. The pouch is preferably constructed of the same material as the vest 10 with similar coloration. The pouch 36 can be position inside the vest 10 on the back panel, but it is preferred that the pouch 36 be positioned on the outside of the vest 10 with the attaching means 32 positioned inside the pouch 36. The pouch 36 has an opening 38 for accessing the rope 30 when needed.

The pouch 36 preferably has pleated sidewalls 40 that fold substantially flat when the pouch 36 is empty. The sidewalls 40 expand to accommodate the rope 30 and collapse when the pouch 36 is empty thereby varying the volume of the pouch 36.

Operation of the present invention is believed to be apparent from the foregoing description and drawings, but a few words will be added for emphasis. The rope 30 is attached to the attaching means 32 prior to the hunt and stored inside the pouch 36. During the hunt when perched in a tree, the hunter ties the free end of the rope 30 to a tree. If the hunter should begin to fall from the tree, the rope will prevent the fall and minimize the risk of injury. When the hunt is completed, the rope 30 is coiled inside the pouch 36. The rope 30 is attached to the reinforced shoulder straps 26, 28 which are sufficient to support the hunter even when the buckle 24 is not fastened.

It will be now appreciated that there has been presented a hunting garment in the form of a vest 10 with a rope 30 attached to prevent a hunter from falling from a perch causing injury. The rope 30 is not attached to the body of the hunter and cannot cause rope burns or other injury to the hunter.

While the invention has been described with reference to a hunting vest, it is apparent that the invention is easily adapted to other hunting garments and articles of clothing. While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. As is evident from the foregoing description, certain aspects of the invention are not limited to the particular details of the examples illustrated, and it is therefore contemplated that other modifications and applications will occur to those skilled the art. It is accordingly intended that the claims shall cover all such modifications and applications as do not depart from the true spirit and scope of the invention.

I claim:

1. A hunting garment for the upper torso of a human body, comprising:
   a vest having a back panel, a left front panel and a right front panel;
   a reinforced waistband having left and right end portions and being attached to said left, right and back panels of said vest with a loop formed by a portion of said reinforced waistband adjacent said back panel free of attachment to said back panel;
   means for securely fastening said end portions of said reinforced waistband one to the other;
   a left panel reinforcing band attached to said left front panel, said back panel and said reinforced waistband;
   a right panel reinforcing band attached to said right front panel, said back panel and said reinforced waistband;
   means for attaching a rope to said loop; and
   a pouch attached to said back panel of said vest with said loop being positioned inside said pouch.

2. A hunting garment, as set forth in claim 1, wherein said pouch has sidewalls that fold substantially flat when said pouch is empty.

3. A hunting garment, as set forth in claim 1, wherein said pouch has pleated sidewalls that expand and collapse to vary the volume of said pouch.

* * * * *